(12) United States Patent
Hiroike et al.

(10) Patent No.: US 10,373,014 B2
(45) Date of Patent: Aug. 6, 2019

(54) OBJECT DETECTION METHOD AND IMAGE SEARCH SYSTEM

(71) Applicant: Hitachi, Ltd., Chiyoda-ku, Tokyo (JP)

(72) Inventors: Atsushi Hiroike, Tokyo (JP); Yuki Watanabe, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/552,823

(22) PCT Filed: Apr. 5, 2016

(86) PCT No.: PCT/JP2016/061104
§ 371 (c)(1),
(2) Date: Aug. 23, 2017

(87) PCT Pub. No.: WO2016/170965
PCT Pub. Date: Oct. 27, 2016

(65) Prior Publication Data
US 2018/0032837 A1 Feb. 1, 2018

(30) Foreign Application Priority Data
Apr. 20, 2015 (JP) .................. 2015-085964

(51) Int. Cl.
*G06K 9/00* (2006.01)
*G06K 9/52* (2006.01)
(Continued)

(52) U.S. Cl.
CPC ............... *G06K 9/52* (2013.01); *G06F 16/00* (2019.01); *G06F 16/50* (2019.01);
(Continued)

(58) Field of Classification Search
CPC combination set(s) only.
See application file for complete search history.

(56) References Cited

U.S. PATENT DOCUMENTS

| 6,539,099 B1 * | 3/2003 | Kellner ............... G06T 11/00 345/473 |
| 2003/0149947 A1 * | 8/2003 | Sarig ................. G03F 1/84 382/144 |

(Continued)

FOREIGN PATENT DOCUMENTS

| EP | 2 637 126 A2 | 9/2013 |
| JP | 2000-123173 A | 4/2000 |

(Continued)

OTHER PUBLICATIONS

International Search Report (PCT/ISA/210) issued in PCT Application No. PCT/JP2016/061104 dated May 17, 2016 with English translation (5 pages).

(Continued)

*Primary Examiner* — Alex Kok S Liew
(74) *Attorney, Agent, or Firm* — Crowell & Moring LLP

(57) ABSTRACT

It is provided an object detection method to be performed by an image analysis device configured with a computer including a processor and a memory, the object detection method comprising: a first step of receiving, by the processor, input of an image and storing the image to the memory; a second step of extracting, by the processor, a partial area which is a part of the input image and storing the partial area to the memory; a third step of evaluating, by the processor, symmetry of the partial area using features extracted from the partial area and reflected features obtained by applying reflection to the features; and a fourth step of determining, by the processor, that the partial area is an object area including an object to be detected in a case where the symmetry of the partial area is evaluated as higher than a predetermined threshold.

6 Claims, 11 Drawing Sheets

(51) Int. Cl.
  *G06F 16/50*   (2019.01)
  *G06F 16/583*  (2019.01)
  *G06T 7/68*    (2017.01)
  *G06K 9/62*    (2006.01)
  *G06F 16/00*   (2019.01)

(52) U.S. Cl.
  CPC ..... *G06F 16/5854* (2019.01); *G06K 9/00275* (2013.01); *G06K 9/00281* (2013.01); *G06K 9/00288* (2013.01); *G06K 9/6212* (2013.01); *G06T 7/68* (2017.01)

(56) References Cited

U.S. PATENT DOCUMENTS

| | | | |
|---|---|---|---|
| 2004/0240725 A1* | 12/2004 | Xu | G06K 9/32 382/154 |
| 2009/0153554 A1* | 6/2009 | Lim | G06T 13/40 345/419 |
| 2010/0299355 A1 | 11/2010 | Shiiyama et al. | |
| 2012/0243778 A1 | 9/2012 | Sumiyoshi et al. | |
| 2015/0078666 A1 | 3/2015 | Hasegawa | |

FOREIGN PATENT DOCUMENTS

| | | |
|---|---|---|
| JP | 2007-334402 A | 12/2007 |
| JP | 2010-272092 A | 12/2010 |
| JP | 2012-203691 A | 10/2012 |
| JP | 2012-243155 A | 12/2012 |
| JP | 2013-186902 A | 9/2013 |
| JP | 2013-228901 A | 11/2013 |
| JP | 2013-250868 A | 12/2013 |

OTHER PUBLICATIONS

Japanese-language Written Opinion (PCT/ISA/237) issued in PCT Application No. PCT/JP2016/061104 dated May 17, 2016 (4 pages).

Sano et al., "An Expansionist SIFT and Application to Symmetrical Plane Object Detection", The Transactions of the Institute of Electronics, Information and Communication Engineers, Aug. 1, 2009, pp. 1176-1184, vol. J92-D, No. 8, with English-language Abstract.

Sawada et al., Detection of Faces Features by using Symmetry Transform, Technical Report of IEICE, Feb. 3, 1999, pp. 31-36, vol. 98, No. 576.

* cited by examiner

OBJECT DETECTION METHOD AND IMAGE SEARCH SYSTEM

CLAIM OF PRIORITY

The present application claims priority from Japanese patent application JP 2015-85964 filed on Apr. 20, 2015, the content of which is hereby incorporated by reference into this application.

BACKGROUND OF THE INVENTION

This invention relates to technology for detecting a given object from an image.

In recent years, services that store and distribute a huge amount of images and videos have been available because of advancement of networks for broader band and storage devices for higher capacity.

For a system that extensively handles contents, search technique is a key issue. A typical search technique searches text information associated with image or video contents. In the technique that searches text information, one or more keywords are entered as a query and images or videos associated with text information including the keywords are returned as search results. There is proposed another technique that extracts information from images themselves and searches the information. As disclosed in JP 2000-123173 A and JP 2007-334402 A, similar image retrieval employs a technique that registers image features obtained by quantifying the features of the images to be registered and searched in a database to enable speedy search.

To extract image features in similar image retrieval, detecting a partial area including the object to be the target of search from an image can be critical. For example, facial search utilizing similar image retrieval detects a facial area and extracts image features from the detected facial area. In similar, similar image retrieval on vehicles detects an area including a vehicle in the image.

To detect an area including a specific object from an image, techniques have been proposed that use learning data. For example, a technique configures a classifier by arranging weak classifiers for determining local feature match in a cascade through learning by an AdaBoost algorithm, using images including an object to be detected as learning data. This technique exhibits high effectiveness in the field of detection of an area including a human face.

This technique requires the classifiers to learn by category of the object to be detected. Semantic categories are not sufficient for the categories in this case. In each category, the looks of images need to be uniform on some level. Taking an example of facial detection, the front faces and the side faces are learned by different classifiers. Further, each class of learning needs a large amount of learning data.

To address the foregoing issues, techniques have been proposed that use dictionary patterns including partial images. For example, a technique registers partial images including an object to be detected to a database as a dictionary pattern and efficiently extracts a partial area similar to the dictionary pattern from an image to detect a partial area. This technique can detect objects looked differently together.

SUMMARY OF THE INVENTION

In the above-described background techniques, in a case where the image to be searched is a partial area of an image, detection processing as described above is required. For the detection processing, both of the approaches need to collect images of an object expected to be a target of search beforehand. For example, learning of classifiers is performed based on collected images and collected images are registered as dictionary patterns. Both of the approaches determine an object to be of interest in advance, perform detection processing, and build up a database. Accordingly, if the object to be of interest is not determined in advance, neither of the approaches is adequate.

It is generally difficult to presume and encompass the objects that the users of a searching system will be interested in and conduct a search. Even if some object to be retrieved is presumed, information to be a clue, namely information for a search query, may be only a part of the object because of a cover-up, for example. In such a situation, the database of images to be searched cannot be prepared through detection processing.

The representative one of inventions disclosed in this application is outlined as follows. There is provided an object detection method to be performed by an image analysis device configured with a computer including a processor and a memory, the object detection method comprising: a first step of receiving, by the processor, input of an image and storing the image to the memory; a second step of extracting, by the processor, a partial area which is a part of the input image and storing the partial area to the memory; a third step of evaluating, by the processor, symmetry of the partial area using features extracted from the partial area and reflected features obtained by applying reflection to the features; and a fourth step of determining, by the processor, that the partial area is an object area including an object to be detected in a case where the symmetry of the partial area is evaluated as higher than a predetermined threshold.

This invention achieves correct detection of a partial area to be of interest. The problems, configurations, and effects other than those described above are clarified in the following description of embodiments.

DETAILED DESCRIPTION OF THE EMBODIMENTS

Hereinafter, embodiments of this invention are described with reference to the drawings.

Embodiment 1

Figure 1:
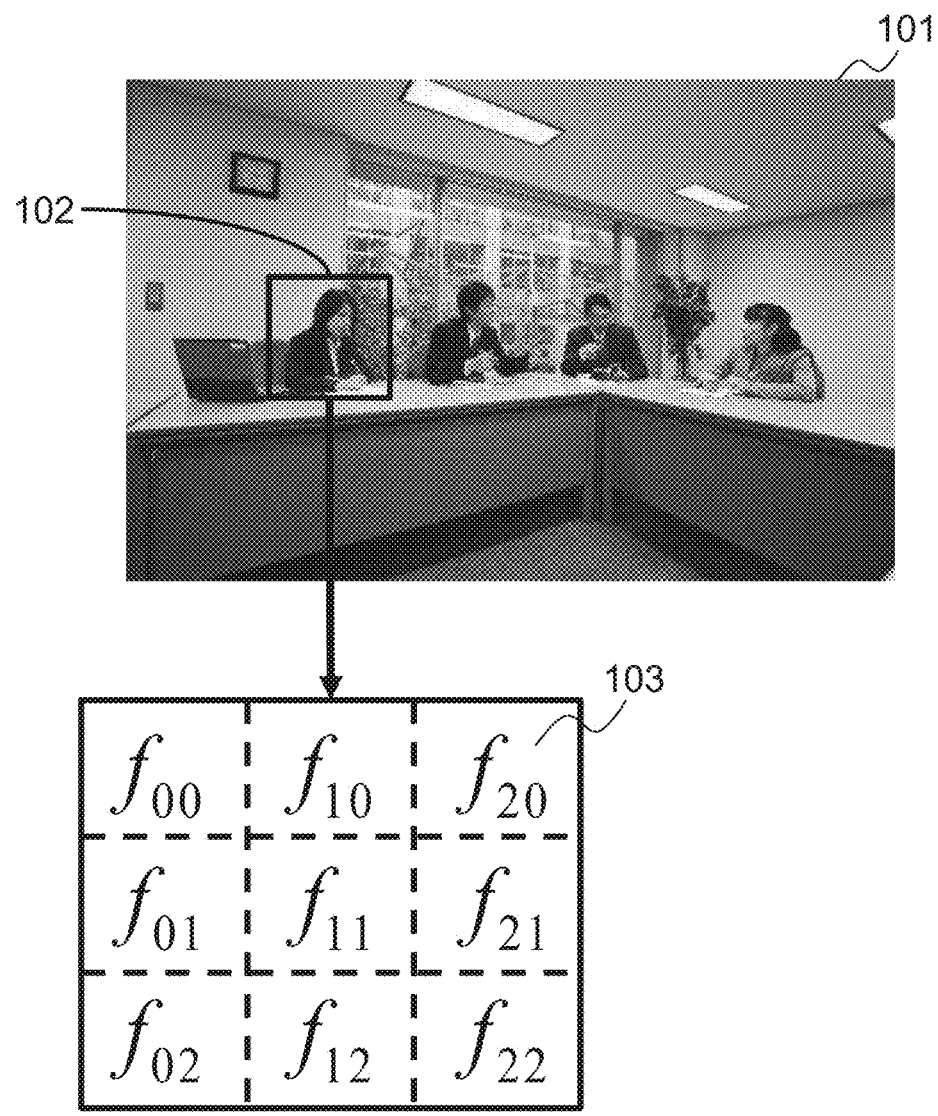
FIG. 1 is a diagram for illustrating extraction of image features according to a first embodiment.

FIG. 1 is a diagram for illustrating extraction of image features for evaluating local symmetry in the search method of the first embodiment.

The method divides a given rectangular partial area 102 of an image 101 into a specific number of blocks (in the example shown in the drawing, 3×3) and extracts an image feature vector 103 from each block. The nine image feature vectors are denoted by f00, f10, f20, f01, f11, f21, f02, f12, and f22. The first suffix of the reference sign of each image feature vector represents the position of the block in the x-direction and the second suffix represents the position of the block in the y-direction.

Figures 2, 3:
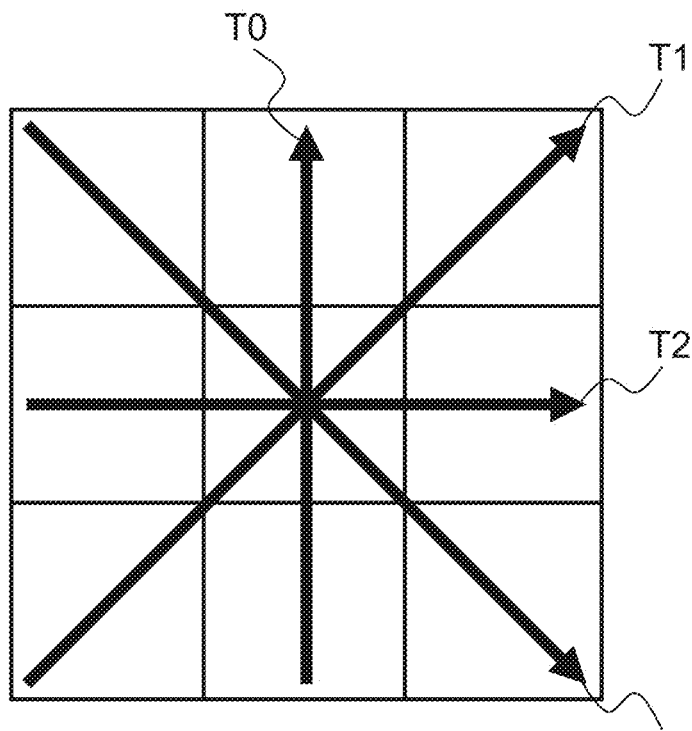
FIG. 2 is a diagram for illustrating a symmetry axes according to the first embodiment.
FIG. 3 is a diagram for illustrating a filter for numerical differentiation according to the first embodiment.

Next, the method studies reflection of the image feature vector of each block about four axes as shown in FIG. 2. The matrices to apply reflection about the axes to an image feature vector are denoted by T0, T1, T2, and T3. Specifically, T0 is a matrix to apply vertical reflection to an image feature vector; T1 is a matrix to apply reflection about the lower left to upper right diagonal to an image feature vector; T2 is a matrix to apply horizontal reflection to an image feature vector; and T3 is a matrix to apply reflection about the upper left to lower right diagonal to an image feature vector. FIG. 2 shows the axes to be the centers of the reflection to be applied by these matrices.

The method evaluates the symmetry of the rectangular area by applying the foregoing transformation matrices to the image feature vectors extracted from the blocks. In an example of evaluating the vertical symmetry, if the vector obtained by vertically reflecting f20 or the vector obtained by multiplying f20 by T0 is close to f00 at the symmetric position about the y-axis, the symmetry is considered as high. Likewise, if the vector obtained by multiplying f21 by T0 is close to f01 and if the vector obtained by multiplying f22 by T0 is close to f02, the symmetry is considered as high. In this way, the vertical symmetry can be expressed as a vector D0 composed of three squared distances between feature vectors as expressed in Formula 1.

$$D_0 = \begin{pmatrix} \|f_{00} - T_0 f_{20}\|^2 \\ \|f_{01} - T_0 f_{21}\|^2 \\ \|f_{02} - T_0 f_{22}\|^2 \end{pmatrix} \quad \text{Formula 1}$$

Likewise, the symmetry about the lower left to upper right diagonal can be expressed as D1 in Formula 2.

$$D_1 = \begin{pmatrix} \|f_{00} - T_1 f_{22}\|^2 \\ \|f_{10} - T_1 f_{21}\|^2 \\ \|f_{01} - T_1 f_{12}\|^2 \end{pmatrix} \quad \text{Formula 2}$$

Likewise, the horizontal symmetry can be expressed as D2 in Formula 3.

$$D_2 = \begin{pmatrix} \|f_{00} - T_2 f_{02}\|^2 \\ \|f_{10} - T_2 f_{12}\|^2 \\ \|f_{20} - T_2 f_{22}\|^2 \end{pmatrix} \quad \text{Formula 3}$$

Likewise, the symmetry about the upper left to lower right diagonal can be expressed as D3 in Formula 4.

$$D_3 = \begin{pmatrix} \|f_{10} - T_3 f_{01}\|^2 \\ \|f_{20} - T_3 f_{02}\|^2 \\ \|f_{21} - T_3 f_{12}\|^2 \end{pmatrix} \quad \text{Formula 4}$$

The method of this embodiment evaluates the symmetry as high when the symmetry increases as a result of transformation of a feature vector. For example, if vertical reflection results in small variation in symmetry between f00 and f02 to be used to calculate D0, the vertical symmetry is not considered as high. Accordingly, as a correction term to quantitatively express this characteristic, a vector E0 composed of squared distances between feature vectors of the blocks when the reflection is not applied is defined as expressed in Formula 5.

$$E_0 = \begin{pmatrix} \|f_{00} - f_{20}\|^2 \\ \|f_{01} - f_{21}\|^2 \\ \|f_{02} - f_{22}\|^2 \end{pmatrix} \quad \text{Formula 5}$$

Likewise, the correction term E1 for D1 is expressed as Formula 6.

$$E_1 = \begin{pmatrix} \|f_{00} - f_{22}\|^2 \\ \|f_{10} - f_{21}\|^2 \\ \|f_{01} - f_{12}\|^2 \end{pmatrix} \quad \text{Formula 6}$$

Likewise, the correction term E2 for D2 is expressed as Formula 7.

$$E_2 = \begin{pmatrix} \|f_{00} - f_{02}\|^2 \\ \|f_{10} - f_{12}\|^2 \\ \|f_{20} - f_{22}\|^2 \end{pmatrix} \quad \text{Formula 7}$$

Likewise, the correction term E3 for D3 is expressed as Formula 8.

$$E_3 = \begin{pmatrix} \|f_{00} - f_{01}\|^2 \\ \|f_{20} - f_{02}\|^2 \\ \|f_{21} - f_{12}\|^2 \end{pmatrix} \quad \text{Formula 8}$$

The method evaluates the symmetry of the rectangular partial area using D0, D1, D2, and D3 and E0, E1, E2, and E3. Specifically, the following four evaluation formulae are defined.

The evaluation formula expressed in Formula 9 evaluates the symmetry using the ratio of total sum of the elements D0, D1, D2, and D3 to the total sum of the elements E0, E1, E2, and E3.

$$\frac{\sum_{i=0}^{3}\sum_{j=0}^{2} D_{ij}}{\sum_{i=0}^{3}\sum_{j=0}^{2} E_{ij}} \qquad \text{Formula 9}$$

The evaluation formula expressed in Formula 10 evaluates the symmetry in four directions and thereafter, evaluates the overall symmetry using the average thereof.

$$\frac{1}{4}\sum_{i=0}^{3} \frac{\sum_{j=0}^{2} D_{ij}}{\sum_{j=0}^{2} E_{ij}} \qquad \text{Formula 10}$$

The evaluation formula expressed in Formula 11 evaluates the symmetry of each block pair and thereafter, evaluates the overall symmetry using the average thereof.

$$\frac{1}{4\times 3}\sum_{i=0}^{3}\sum_{j=0}^{2} \frac{D_{ij}}{E_{ij}} \qquad \text{Formula 11}$$

The evaluation formula expressed in Formula 12 evaluates the symmetry in four directions and thereafter, evaluates the overall symmetry using the largest value.

$$\text{Max}\left(\frac{\sum_{j=0}^{2} D_{0j}}{\sum_{j=0}^{2} E_{0j}}, \frac{\sum_{j=0}^{2} D_{1j}}{\sum_{j=0}^{2} E_{1j}}, \frac{\sum_{j=0}^{2} D_{2j}}{\sum_{j=0}^{2} E_{2j}}, \frac{\sum_{j=0}^{2} D_{3j}}{\sum_{j=0}^{2} E_{3j}}\right) \qquad \text{Formula 12}$$

Among these evaluation formulae, the evaluation formula most suitable for the specific application of this invention should be employed case by case.

Next, image features to be used in this embodiment are described.

The image features to be used in this embodiment have to be extracted by an algorithm capable of extracting an image feature in the form of a vector in a certain number of dimensions from an area corresponding to a divided block. Furthermore, a feature invariant under reflection cannot be employed. For example, average color of a block, which is a feature represented by an average RGB value of an image, is invariant under reflection; accordingly, this embodiment cannot employ average color.

To extract a feature that is not invariant under reflection, there are a plurality of known techniques. For example, a feature calculated from average colors of sub blocks obtained by dividing a block and a feature expressed in a histogram of color distribution in each sub block are not invariant under reflection. In a case of a grayscale image, an edge pattern obtained by extracting characteristics of the patterns of local luminance changes is not invariant under reflection, either. In the following, an example using distribution of the magnitudes of intensity gradient vectors as a feature is described in detail for easy understanding of the method of this embodiment.

An intensity gradient vector can be calculated by applying a two-dimensional numerical differentiation to a grayscale image. FIG. 3 shows an example of a filter for numerical differentiation. From the intensity gradient vector (gx, gy) at a pixel position (x, y) obtained by the differentiation filter, the orientation θ of the vector and the squared norm p of the vector can be calculated as shown in the following Formulae 13.

$$\theta = \arctan(g_y, g_x)$$
$$p = g_x^2 + g_y^2 \qquad \text{Formulae 13}$$

The orientations θ of vectors range from 0 to 360 degrees. By quantizing this range into an appropriate number of equally-spaced levels and compiling the squared norms p in a rectangular area, the distribution of the magnitudes of the intensity gradient vectors can be expressed as histogram data whose axis is direction of the intensity gradient vector.

Figure 4:
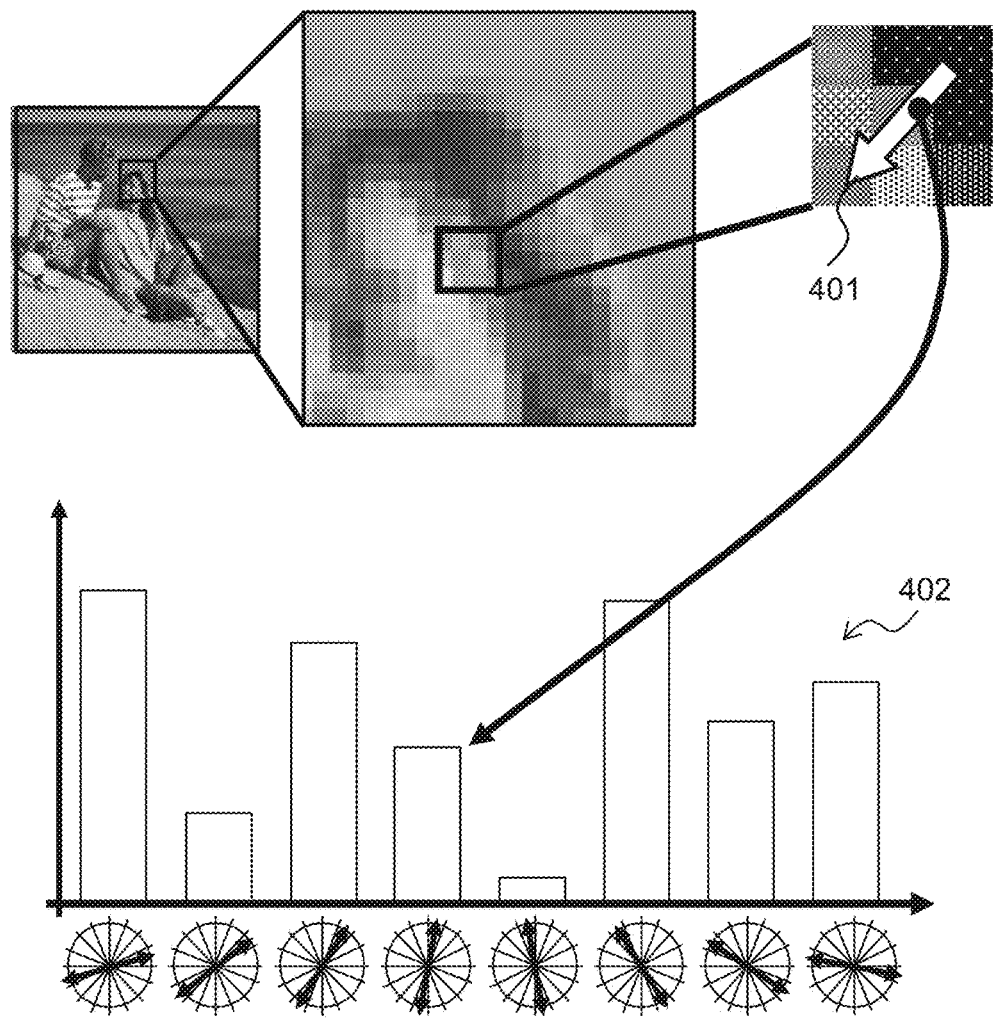
FIG. 4 is a diagram for illustrating a feature of intensity gradients distribution according to the first embodiment.

FIG. 4 is a diagram for illustrating this processing.

The method first extracts intensity gradient vectors 401 representing the gradients of luminance of pixels from an image, compiles the extracted intensity gradient vectors, and calculates histogram data 402. In order to apply reflection in four directions in the method of this embodiment, the number of quantization levels should be eight or a multiple of eight. It is preferable to make the center of the first bin in the quantization correspond to the x-axis.

Assuming that the number of quantization levels of this feature is eight, an eight-dimensional image feature vector is extracted from each block. The reflection matrix T0 to evaluate the vertical symmetry of such a vector is expressed as Formula 14.

$$T_0 = \begin{pmatrix} 0 & 0 & 0 & 0 & 1 & 0 & 0 & 0 \\ 0 & 0 & 0 & 1 & 0 & 0 & 0 & 0 \\ 0 & 0 & 1 & 0 & 0 & 0 & 0 & 0 \\ 0 & 1 & 0 & 0 & 0 & 0 & 0 & 0 \\ 1 & 0 & 0 & 0 & 0 & 0 & 0 & 0 \\ 0 & 0 & 0 & 0 & 0 & 0 & 0 & 1 \\ 0 & 0 & 0 & 0 & 0 & 0 & 1 & 0 \\ 0 & 0 & 0 & 0 & 0 & 1 & 0 & 0 \end{pmatrix} \qquad \text{Formula 14}$$

Likewise, the reflection matrix T1 to evaluate the symmetry about the lower left to upper right diagonal is expressed as Formula 15.

$$T_1 = \begin{pmatrix} 0 & 0 & 0 & 0 & 0 & 0 & 1 & 0 \\ 0 & 0 & 0 & 0 & 0 & 1 & 0 & 0 \\ 0 & 0 & 0 & 0 & 1 & 0 & 0 & 0 \\ 0 & 0 & 0 & 1 & 0 & 0 & 0 & 0 \\ 0 & 0 & 1 & 0 & 0 & 0 & 0 & 0 \\ 0 & 1 & 0 & 0 & 0 & 0 & 0 & 0 \\ 1 & 0 & 0 & 0 & 0 & 0 & 0 & 0 \\ 0 & 0 & 0 & 0 & 0 & 0 & 0 & 1 \end{pmatrix} \qquad \text{Formula 15}$$

Likewise, the reflection matrix T2 to evaluate the horizontal symmetry is expressed as Formula 16.

$$T_2 = \begin{pmatrix} 1 & 0 & 0 & 0 & 0 & 0 & 0 & 0 \\ 0 & 0 & 0 & 0 & 0 & 0 & 0 & 1 \\ 0 & 0 & 0 & 0 & 0 & 0 & 1 & 0 \\ 0 & 0 & 0 & 0 & 0 & 1 & 0 & 0 \\ 0 & 0 & 0 & 0 & 1 & 0 & 0 & 0 \\ 0 & 0 & 0 & 1 & 0 & 0 & 0 & 0 \\ 0 & 0 & 1 & 0 & 0 & 0 & 0 & 0 \\ 0 & 1 & 0 & 0 & 0 & 0 & 0 & 0 \end{pmatrix} \quad \text{Formula 16}$$

Likewise, the reflection matrix T3 to evaluate the symmetry about the upper left to lower right diagonal is expressed as Formula 17:

$$T_3 = \begin{pmatrix} 0 & 0 & 1 & 0 & 0 & 0 & 0 & 0 \\ 0 & 1 & 0 & 0 & 0 & 0 & 0 & 0 \\ 1 & 0 & 0 & 0 & 0 & 0 & 0 & 0 \\ 0 & 0 & 0 & 0 & 0 & 0 & 0 & 1 \\ 0 & 0 & 0 & 0 & 0 & 0 & 1 & 0 \\ 0 & 0 & 0 & 0 & 0 & 1 & 0 & 0 \\ 0 & 0 & 0 & 0 & 1 & 0 & 0 & 0 \\ 0 & 0 & 0 & 1 & 0 & 0 & 0 & 0 \end{pmatrix} \quad \text{Formula 17}$$

As to the feature based on the intensity gradient vectors, the processing may ignore the brightness inversion between an intensity gradient oriented from a brighter pixel toward a darker pixel and an intensity gradient oriented from a darker pixel toward a brighter pixel and distribute the orientations θ of the vectors to a range from 0 to 180 degrees. In this case, the number of quantization levels is preferably four or a multiple of four to apply four-direction reflection in the method of this embodiment.

Figure 5A:
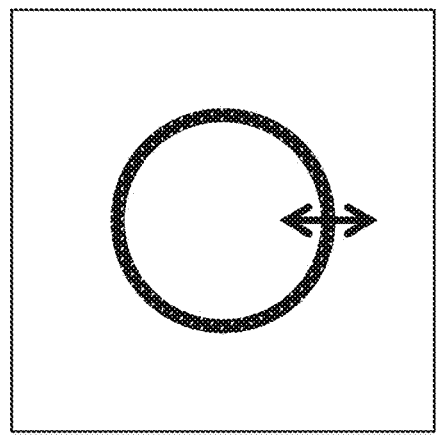
FIGS. 5A to 5C are diagrams for illustrating an orientation of an intensity gradient vector according to the first embodiment.
Figure 5B:
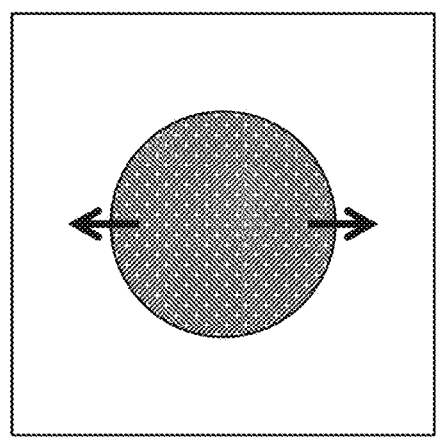
Figure 5C:
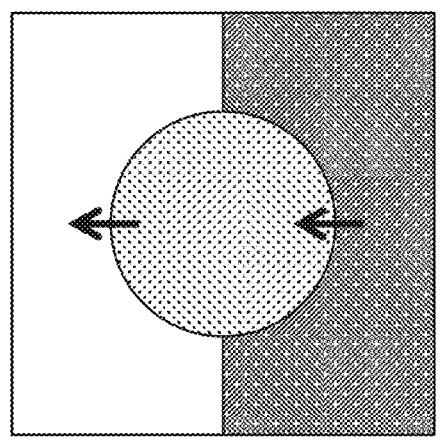

Now, with reference to FIGS. 5A to 5C, the orientation of an intensity gradient vector is described.

In a binary image (for example, a line drawing using binary values representing white and black) as shown in FIG. 5A, intensity gradient vectors having opposite orientations appear contiguously. Accordingly, it is sufficient to obtain distribution of the orientations of intensity gradient vectors by using only ones of the pairs of the intensity gradient vectors, the intensity gradient vectors are distributed in the range from 0 to 180 degrees. In contrast, in a multi-valued image (for example, a multi-valued grayscale image or a color image) as shown in FIG. 5B, intensity gradient vectors having various orientations appear. Accordingly, it is required to distribute the intensity gradient vectors in the range of 0 to 360 degrees. Particularly, in a case where the background luminance changes as shown in FIG. 5C, accurate distribution of intensity gradient vectors cannot be obtained with the range of 0 to 180 degrees. As noted from these examples, it is preferable to select the range of distribution of intensity gradient vectors depending on the type of the input image.

The selection of the range of distribution of intensity gradient vectors may be made by the operator in accordance with the characteristics of the input image. Alternatively, the computer may examine the input image and if the input image is identified as a binary image, the computer may select to distribute the intensity gradient vectors in the range of 0 to 180 degrees and otherwise, select to distribute the intensity gradient vectors in the range of 0 to 360 degrees.

When the number of quantization levels for this feature is four, a four-dimensional image feature vector is extracted from each block. In this case, the reflection matrix T0 to evaluate the vertical symmetry is expressed as Formula 18:

$$T_0 = \begin{pmatrix} 1 & 0 & 0 & 0 \\ 0 & 0 & 0 & 1 \\ 0 & 0 & 1 & 0 \\ 0 & 1 & 0 & 0 \end{pmatrix} \quad \text{Formula 18}$$

Likewise, the reflection matrix T1 to evaluate the symmetry about the lower left to upper right diagonal is expressed as Formula 19:

$$T_1 = \begin{pmatrix} 0 & 0 & 1 & 0 \\ 0 & 1 & 0 & 0 \\ 1 & 0 & 0 & 0 \\ 0 & 0 & 0 & 1 \end{pmatrix} \quad \text{Formula 19}$$

Further, the reflection matrix T2 to evaluate the horizontal symmetry is identical to T0 and the reflection matrix T3 to evaluate the symmetry about the upper left to lower right diagonal is identical to T1.

In a case of using features based on intensity gradient vectors, the evaluation formulae defined as Formulae 9 to 12 are all invariant to the norms of the feature vectors. This is advantageous because unchangeable symmetry evaluation can be obtained on the absolute contrast of the image. However, in the area where little intensity gradient exists or the area where the feature vector is close to a zero vector, the evaluation formulae are unstable. To address such a situation, it is advisable to eliminate the rectangular area where the average or the sum of the intensity gradients in the area is lower than a specific threshold from evaluation. Alternatively, a correction term to magnify the value of the evaluation formula when the average or the sum of the intensity gradients in the area is small may be added to determine a more appropriate partial area of interest.

Figure 6:
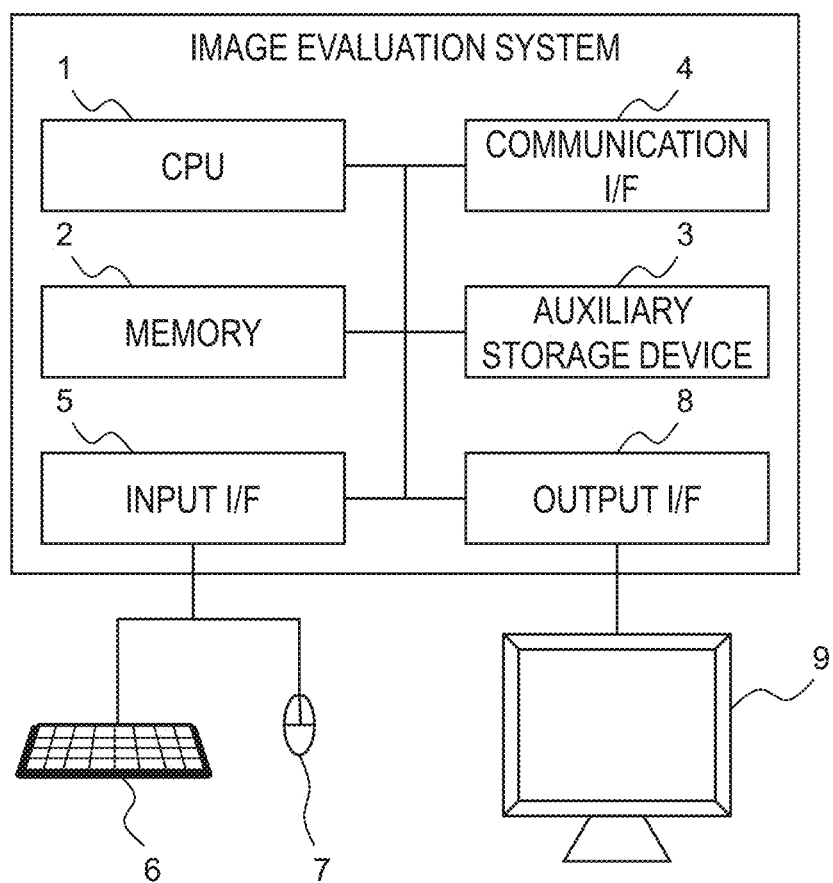
FIG. 6 is a block diagram for illustrating a physical configuration of an image evaluation system according to the first embodiment.

FIG. 6 is a block diagram for illustrating a physical configuration of an image evaluation system in the first embodiment.

The image evaluation system in this embodiment is configured with a computer including a processor (CPU) 1, a memory 2, an auxiliary storage device 3, a communication interface 4, an input interface 5, and an output interface 8.

The processor 1 executes programs stored in the memory 2. The memory 2 includes a ROM of a non-volatile memory device and a RAM of a volatile memory device. The ROM stores invariable programs (for example, the BIOS). The RAM is a high-speed and volatile memory device like a DRAM (Dynamic Random Access Memory) and temporarily stores programs to be executed by the processor 1 and data to be used by the processor 1 in executing the programs.

The auxiliary storage device 3 is a high-capacity and non-volatile storage device such as a magnetic storage device (HDD) or a flash memory (SSD) and stores programs to be executed by the processor 1. That is to say, a program is read from the auxiliary storage device 3, loaded to the memory 2, and executed by the processor 1.

The communication interface 4 is a network interface device for controlling communication with other apparatuses such as a file server and a gateway in accordance with a predetermined protocol.

The input interface 5 is an interface connected with a keyboard 6 and/or a mouse 7 to receive an input from the operator. The output interface 8 is an interface connected with a display device 9 and/or a printer to output a result of execution of a program in a form that can be seen by the operator.

The programs to be executed by the processor 1 are provided to the image evaluation system through a removable medium such as a CD-ROM or a flash memory or via the network and stored to the non-volatile auxiliary storage device 3 of a non-transitory storage medium. For that purpose, it is preferable that the image evaluation system include an interface to retrieve data from a removable medium.

The image evaluation system is a computer system configured with a physically single computer or a computer system logically and physically configured with a plurality of computers; the system may operate on a separate thread of a single computer or on a virtual computer constructed on resources of a plurality of physical computers.

Figure 7:
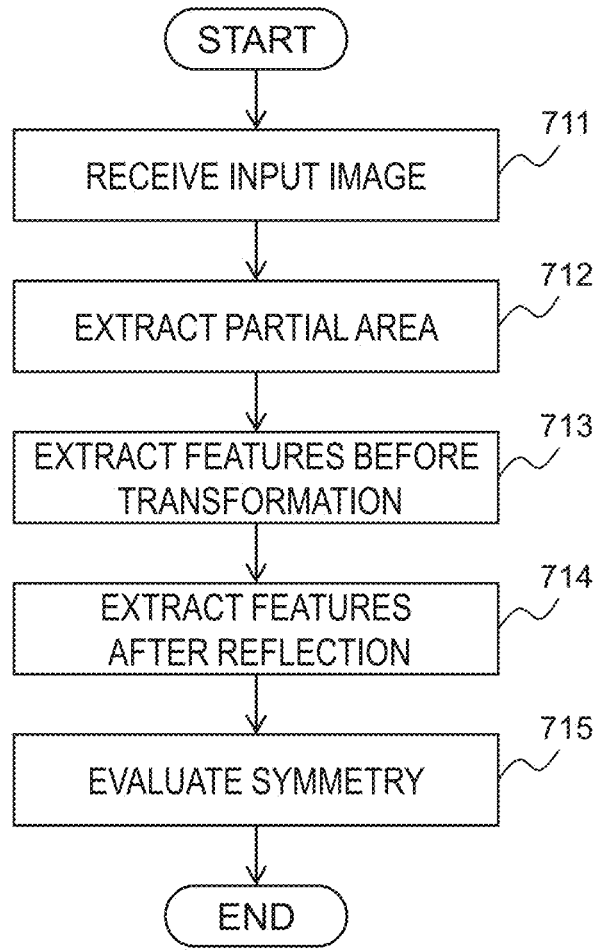
FIG. 7 is a flowchart of symmetry evaluation processing according to the first embodiment.

FIG. 7 is a flowchart of symmetry evaluation processing in the first embodiment.

First, the processor 1 receives input of an image to be evaluated (711). For example, the input image is input through the communication interface 4 or a not-shown data input and output port (for example, a USB port) in accordance with an instruction of an operator.

The processor 1 extracts a partial area from the input image (712) and extracts features from the extracted partial area before being transformed (713). Thereafter, the processor 1 applies reflection to the features extracted from the partial area and determines the features of the partial area after being transformed (714).

The processor 1 compares the features before transformation with the features after transformation to evaluate the symmetry (715).

As described above, the first embodiment of this invention enables detection of a partial area to be of interest without predetermination of an object of interest.

Embodiment 2

Hereinafter, the second embodiment is described where the method of the first embodiment is applied to an image search service.

Figure 8:
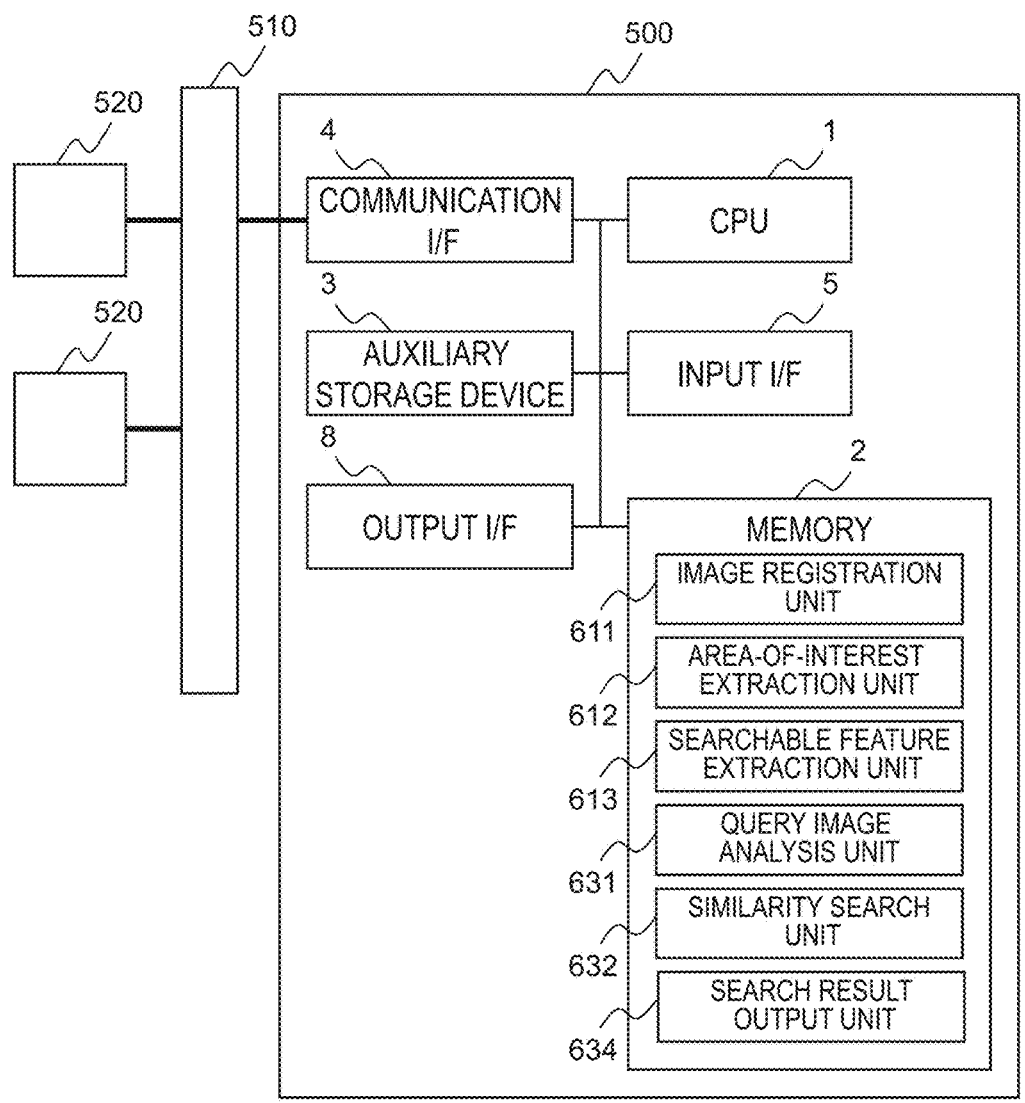
FIG. 8 is a diagram for illustrating a configuration of an image search system according to a second embodiment.

FIG. 8 is a diagram for illustrating a configuration of an image search system in the second embodiment.

The computer system 500 provides a search service. The functions provided by the search service are provided to the users of terminal computers 520 through a network system 510.

The computer system 500 can be configured with a typical server including a processor, a memory, and a communication interface. The physical configuration of the computer system 500 may be the same as the computer illustrated in FIG. 6.

The memory 2 of the computer system 500 stores a program to implement an image registration unit 611, an area-of-interest extraction unit 612, a searchable feature extraction unit 613, a query image analysis unit 631, a similarity search unit 632, and a search result output unit 634. These units are described later.

The terminal computer 520 can be configured with a typical personal computer or tablet terminal including a processor, a memory, and a communication interface. The physical configuration of the terminal computer 520 may be the same as the computer shown in FIG. 6. The functions provided by the terminal computer 520 to the user may be configured with a web browser or a dedicated application.

Figure 9:
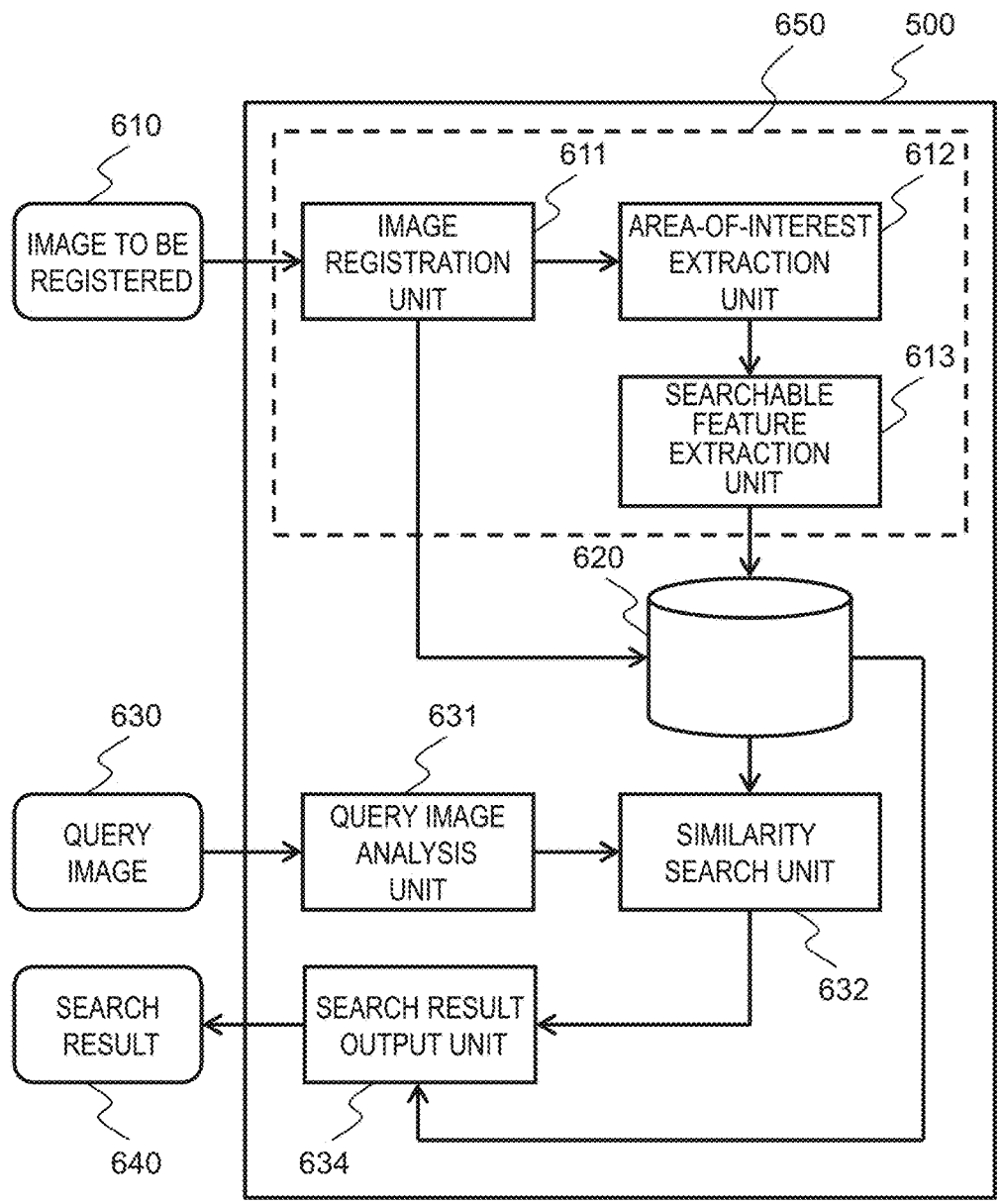
FIG. 9 is a diagram for illustrating a logical configuration of the image search system according to the second embodiment.

FIG. 9 is a diagram for illustrating a logical configuration of the image search system in the second embodiment.

Upon receipt of an image 610 to be registered for future search, the image registration unit 611 saves the storage location of the image data, the thumbnail image for display, and bibliographic information on the image to a database 620. Subsequently, the area-of-interest extraction unit 612 applies the method of the first embodiment to extract a set of rectangular partial areas to be of interest from the registered image. Thereafter, the searchable feature extraction unit 613 extracts image features of the extracted rectangular partial areas. The extracted image features are associated with the registered image and stored in the database 620.

In a search, upon receipt of a query image 630, the query image analysis unit 631 extracts an image feature to be searched for. The similarity search unit 632 conducts similarity search based on the distance between vectors on the image feature extracted from the query image against the image features of the rectangular partial areas stored in the database 620 to acquire a rectangular partial area similar to the query image as a search result. Eventually, the search result output unit 634 creates information to be returned to the search requestor using the similarity search result and the information stored in the database 620 and sends the created information to the search requestor as a search result 640.

The image features handled by the searchable feature extraction unit 613 and the query image analysis unit 631 are calculated based on the distribution of colors and/or the distribution of intensity gradient vectors. The specific image feature can be selected from the known features. The similarity search using the aforementioned features can also be selected from the known methods.

Next, processing of the area-of-interest extraction unit 612 to which the method of this embodiment is directly applied is described in detail.

Implementation examples of the system of this embodiment include the image search system illustrated in FIGS. 8 and 9, and in addition, an image analysis device 650 including an image registration unit 611, an area-of-interest extraction unit 612, and a searchable feature extraction unit 613 to detect an object.

Figure 10:
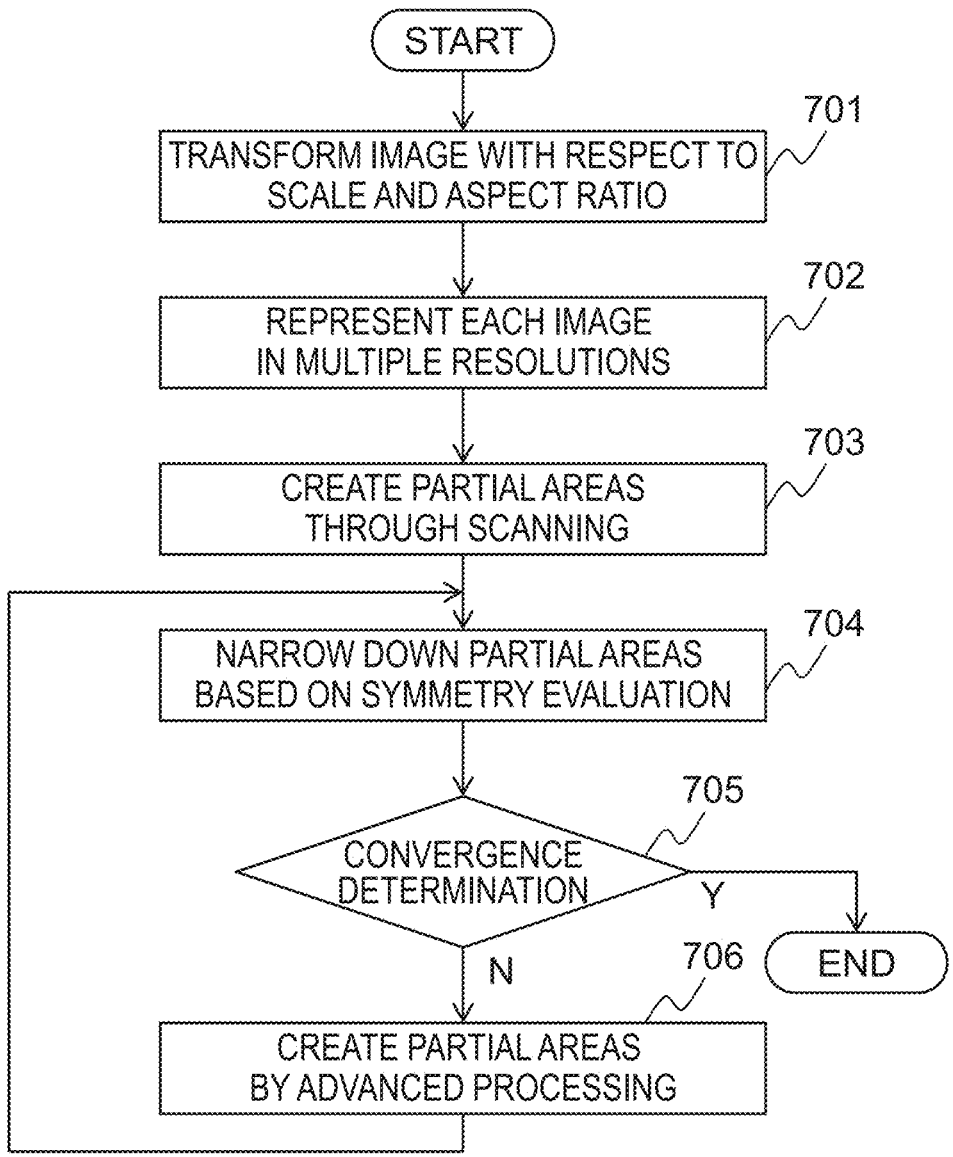
FIG. 10 is a flowchart of processing executed by an area-of-interest extraction unit according to the second embodiment.

FIG. 10 is a flowchart of processing of the area-of-interest extraction unit 612.

First, the area-of-interest extraction unit 612 creates a plurality of images having appropriate scale and aspect ratio from a registered image (701). The aspect ratio (the ratio of the longer side and the shorter side of the image) can be determined by the user. The aspect ratio can be determined automatically in accordance with the aspect of the image to be detected. The aspect ratio can also be determined automatically in accordance with the type of the image to be detected. For example, when the user wants to detect an image of a human, a vertically long image can be used.

Next, the area-of-interest extraction unit 612 represents the created images in multiple resolutions (702). Thereafter, the area-of-interest extraction unit 612 creates rectangular partial areas to be candidate partial areas of interest through later-described scanning from the plurality of images represented in multiple resolutions and calculates the symmetry of each of the created partial areas (703). The processing of Step 703 corresponds to the foregoing symmetry evaluation processing in the first embodiment (FIG. 7).

Subsequently, the area-of-interest extraction unit 612 sorts the large number of partial areas created through scanning based on the evaluation value of the symmetry and selects a predetermined number of high-ranking partial areas as candidate partial areas of interest (704). Next, the area-of-interest extraction unit 612 determines whether narrowing down the partial areas of interest is completed through convergence determination (705). Specifically, when a partial area of interest does not change or the number of repeats exceeds a specific value, the area-of-interest extraction unit 612 determines that the narrowing down processing has converged.

After determining that narrowing down of the partial areas to be of interest is not completed, the area-of-interest extraction unit 612 creates new partial areas from each candidate area of interest as of the moment through later-described advanced processing, calculates the symmetry of each of the partial areas, and adds candidate areas of interest (706). The area-of-interest extraction unit 612 returns to Step 704 and evaluates the symmetry again to narrow down the candidate areas of interest created by the advanced processing.

Figure 11:
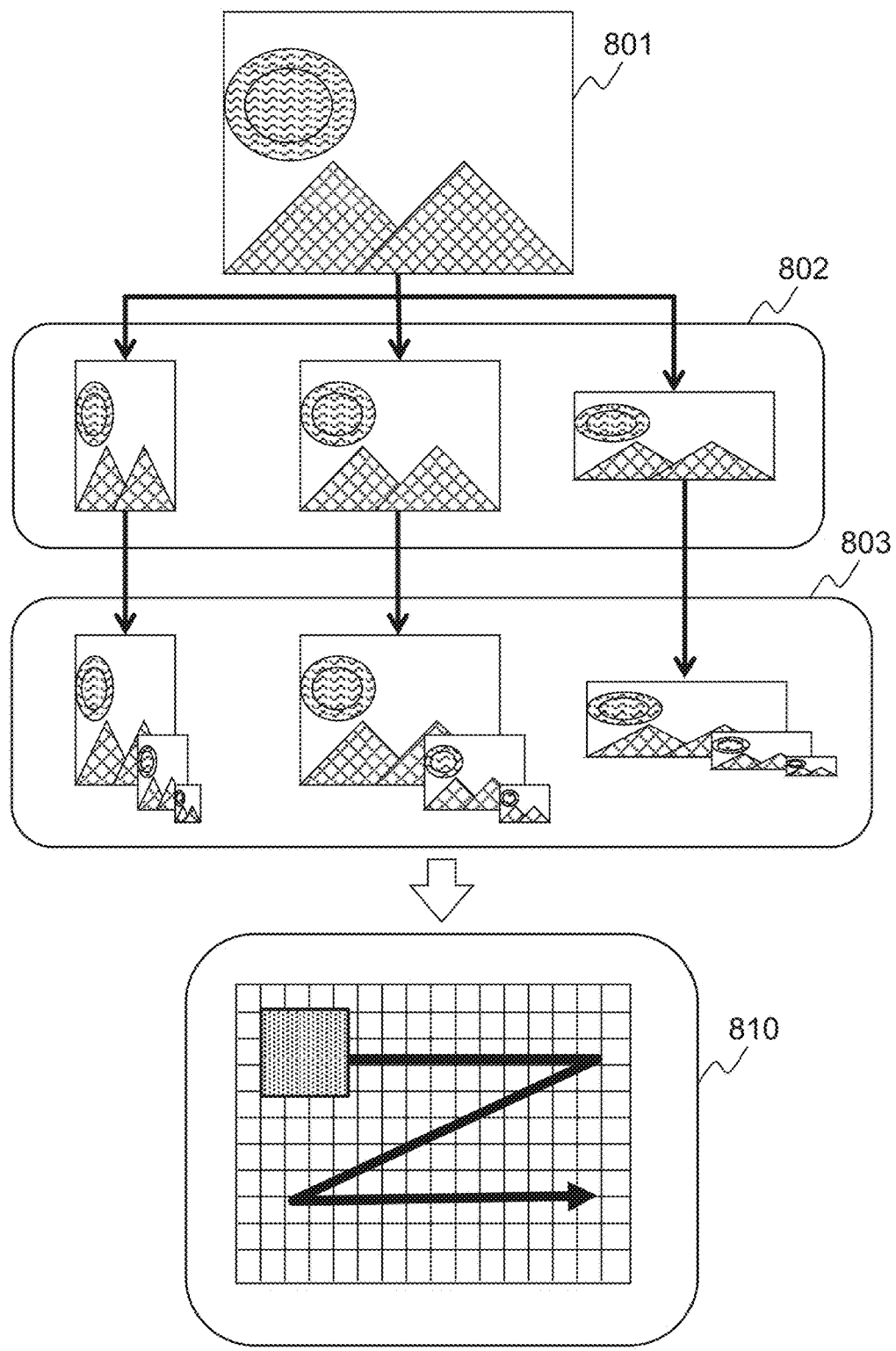
FIG. 11 is a diagram for illustrating Steps 701 to 703 in an area-of-interest extraction processing according to the second embodiment.

FIG. 11 is a diagram for illustrating Steps 701 to 703 in the processing of the area-of-interest extraction unit (FIG. 10).

In extracting an area of interest, the size of the partial area in an image needs to be estimated appropriately depending on the field of application. Particularly, when a partial area is determined to be smaller than necessary, extraction of unnecessary partial areas or erroneous detection and processing time increase to cause an operational problem. For example, when the size of one block in this symmetry evaluation method is determined to be 8×8 pixels, the size of a partial area will be 24×24 pixels. If approximately 10% of the size of the image is sufficient for a partial area of interest, a size of approximately 240×240 pixels will be sufficient for the image.

The shape of the partial area of interest is not necessarily a square; there are many cases that need to extract a horizontally or vertically long rectangle. When a horizontally long rectangle needs to be extracted, this embodiment changes the aspect ratio of the original image into a vertically long image and divides the image into square grid blocks to evaluate the symmetry. If a rectangular area created through this processing is returned to the coordinate system of the original image, a horizontally long rectangle is obtained. Likewise, when a vertically long rectangle needs to be extracted, this embodiment changes the aspect ratio of the original image into a horizontally long image to perform the processing.

The processing performed from the foregoing two viewpoints is the transformation of a registered image 801 to images 803 in FIG. 11.

The area-of-interest extraction unit 612 scales the registered image 801 appropriately to creates three images 802 of an image where the width is reduced to a half, an image where the aspect ratio is maintained, and an image where the height is reduced to a half. Further, the area-of-interest extraction unit 612 creates images 803 through two-step multi-resolution transformation where the size of the image is reduced to a half at each step.

The area-of-interest extraction unit 612 scans the nine created images 803 (810). In the scanning processing 810, the area-of-interest extraction unit 612 translates a window in each image by specific number of pixels to roughly create rectangular areas.

Figure 12:
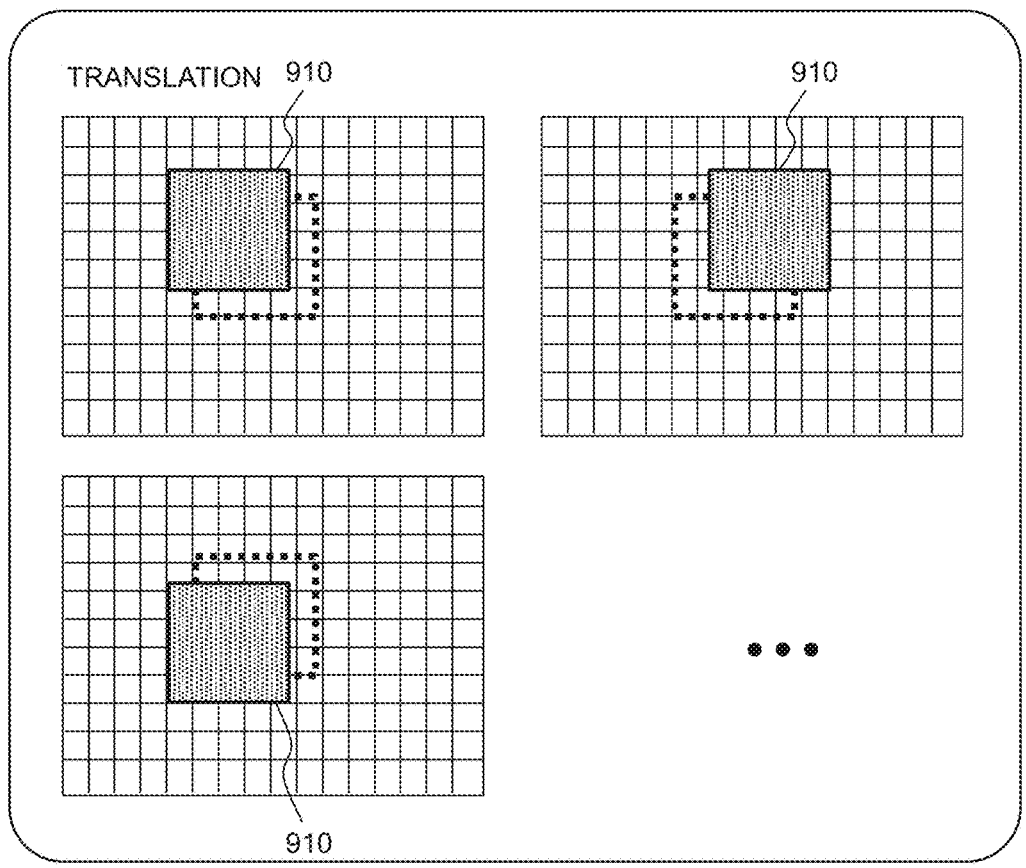
FIG. 12 is a diagram for illustrating the advanced processing (Step 706) in the area-of-interest extraction processing according to the second embodiment.
Figure 12:
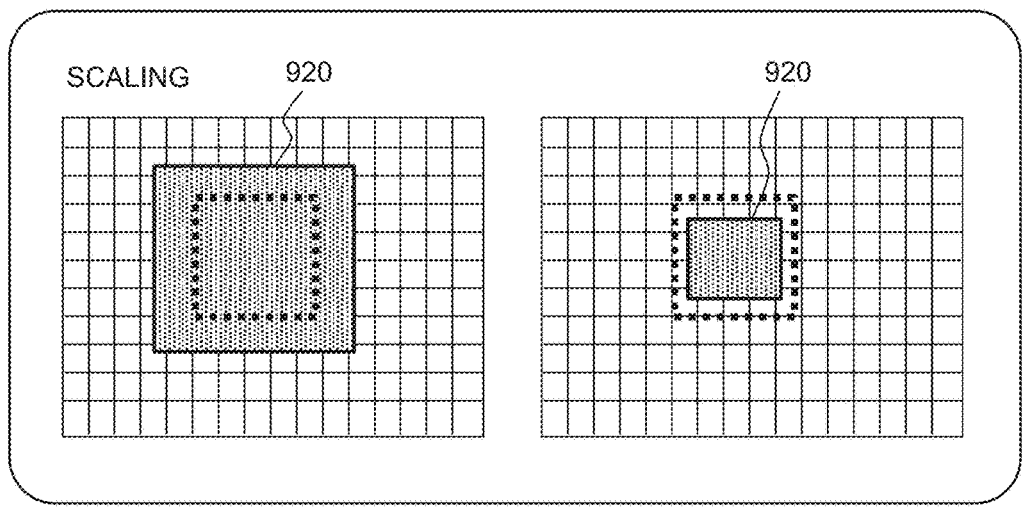

FIG. 12 is a diagram for illustrating the advanced processing (Step 706) in the processing of the area-of-interest extraction unit (FIG. 10).

The area-of-interest extraction unit 612 creates rectangular areas 910 by slightly translating a candidate partial area of interest vertically and horizontally and rectangular areas 920 by slightly scaling up and down the candidate partial area of interest, and further creates rectangular areas by translating each of the scaled-up and scaled-down rectangular areas vertically and horizontally. The area-of-interest extraction unit 612 treats all the created rectangular areas as new candidate partial areas of interest for the original candidate partial area of interest. The number of rectangular areas created by translation is eight as results of translation in the up, down, left, right, and oblique directions. The number of rectangular areas created by scaling up and down is two. The number of rectangular areas created by translation of the scaled-up area and the scaled-down area is eight for each of the scaled-up area and the scaled-down area. One seed of rectangular area results in 26 new rectangular areas at maximum in total and the area-of-interest extraction unit 612 evaluates the symmetry on each of them.

As described above, the advanced processing 706 is repeated. The slight variations in each repeated processing can be defined as the following formulae:

$$d_x = \frac{s_x}{2^q}$$
$$d_y = \frac{s_y}{2^q}$$
$$d_z = 2^{\frac{1}{2^q}}$$

Formula 20

In Formulae 20, q represents the number of repeats of the advanced processing; sx and sy represent the distances of a horizontal step and a vertical step, respectively, translated in the scanning processing 703, and dx and dy represent the variations in the horizontal direction and the vertical direction, respectively, in the q-th advanced processing. Furthermore, dz represents the upscaling factor in the q-th advanced processing; in a case of downscaling, the downscaling factor is 1/dz. As noted from Formulae 20, the variation becomes smaller as the processing is repeated. Since the image to be processed is a discrete digital image, no new candidate area is created by slight variation after the processing is repeated sufficient times. At least when a new candidate area is no longer created, the area-of-interest extraction unit 612 may exit the advanced processing 706.

As set forth above, the embodiment can accurately detect a partial area to be of interest, irrespective of the object.

The embodiment evaluates the symmetry of a partial area using the features extracted from the partial area, the reflected features obtained by reflection of the features, and the average magnitude of the features; accordingly, a partial area can be detected with high accuracy.

The embodiment divides a partial area into a specific size of rectangular blocks, extracts features from the blocks, and transforms the features of the blocks by reflection; accordingly, the reflected features can be calculated with simple operations.

The embodiment creates areas by changing at least either the position or the size of a partial area and evaluates the symmetry of the features of the partial area and the features of the created areas; accordingly, an appropriate partial area can be extracted without cutting off the part to be of interest. For example, a human face will not be cut off, which facilitates the application to facial recognition in which the face is preferably located at the center of the partial area.

The embodiment changes the range to distribute the orientations of the intensity gradient vectors extracted as features depending on the type of the input image; accordingly, the features can be calculated appropriately.

The embodiment transforms an input image to have a specified aspect ratio and extracts a partial area from the transformed image having the specified aspect ratio, eliminating the anisotropy of the extracted features (intensity gradient vectors); accordingly, the features are calculated accurately. In this connection, a rectangular partial area may cause a bias in the histograms of intensity gradient vectors and therefore, a square is preferable for a partial area to evaluate the symmetry.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, processing modules, and processing means, for all or a part of them, may be implemented by hardware: for example, by designing an integrated circuit, and may be implemented by software, which means that a processor interprets and executes programs providing the functions.

The information of programs, tables, and files to implement the functions may be stored in a storage device such as a memory, a hard disk drive, or an SSD (a Solid State Drive), or a storage medium such as an IC card, or an SD card.

The drawings illustrate control lines and information lines as considered necessary for explanation but do not illustrate all control lines or information lines in the products. It can be considered that almost of all components are actually interconnected.

What is claimed is:

1. An object detection method to be performed by an image analysis device configured with a computer including a processor and a memory, the object detection method comprising:
    a first step of receiving, by the processor, input of an image and storing the image to the memory;
    a second step of extracting, by the processor, a partial area which is a part of the input image and storing the partial area to the memory;
    a third step of evaluating, by the processor, symmetry of the partial area using features extracted from the partial area and reflected features obtained by applying one or more transformation matrices to corresponding one or more image feature vectors obtained from the features; and
    a fourth step of determining, by the processor, that the partial area is an object area including an object to be detected in a case where the symmetry of the partial area is evaluated as higher than a predetermined threshold,
    wherein the third step includes:
    a step of distributing the orientations of intensity gradient vectors extracted as the features to a range from 0 to 180 degrees to process in a case where the input image is a binary image; and
    a step of distributing the orientations of intensity gradient vectors extracted as the features to a range from 0 to 360 degrees to process in a case where the input image is not a binary image.

2. The object detection method according to claim 1, wherein the third step includes a step of evaluating symmetry of the partial area using features extracted from the partial area, reflected features obtained by applying one or more transformation matrices to corresponding one or more image feature vectors obtained from the features, and an average magnitude of the features.

3. The object detection method according to claim 1, wherein the third step includes a step of dividing the partial area into rectangular blocks having a predetermined size and extracting features from each block.

4. The object detection method according to claim 1, wherein the third step includes steps of creating an area by changing at least one of position and size of the partial area, evaluating symmetry of features of the partial area and symmetry of features of the created area, and determining that an area evaluated to have symmetry higher than a predetermined threshold is an object area including an object to be detected.

5. The object detection method according to claim 1, wherein the second step includes a step of transforming the input image to have a specified aspect ratio and extracting a partial area from the image transformed in aspect ratio.

6. An image search system configured to:
    for each of input images for registration, store features of an object area determined by the method according to claim 1 to a database; and
    compare features extracted from an input query image with features of the registered images to retrieve a registered image similar to the query image.

* * * * *